(12) United States Patent
Koppert

(10) Patent No.: US 8,001,487 B2
(45) Date of Patent: Aug. 16, 2011

(54) METHOD AND SYSTEM FOR ORGANIZING AND DISPLAYING DATA

(75) Inventor: Erik Koppert, East Kew (AU)

(73) Assignee: Laas & Sonder Pty Ltd, Acacia Ridge, Queensland (AU)

( * ) Notice: Subject to any disclaimer, the term of this patent is extended or adjusted under 35 U.S.C. 154(b) by 708 days.

(21) Appl. No.: 11/734,745

(22) Filed: Apr. 12, 2007

(65) Prior Publication Data
US 2007/0245260 A1    Oct. 18, 2007

(30) Foreign Application Priority Data
Apr. 12, 2006 (AU) ................................ 2006901909

(51) Int. Cl.
*G06F 3/048* (2006.01)

(52) U.S. Cl. ........ 715/830; 715/810; 715/828; 715/829; 715/833

(58) Field of Classification Search .................. 715/830, 715/784, 810, 713, 786, 787, 792, 793, 818, 715/828, 829, 833
See application file for complete search history.

(56) References Cited

U.S. PATENT DOCUMENTS

| | | | |
|---|---|---|---|
| 5,295,242 A * | 3/1994 | Mashruwala et al. ........ | 715/853 |
| 5,546,529 A * | 8/1996 | Bowers et al. ................ | 715/848 |
| 5,704,051 A * | 12/1997 | Lane et al. .................... | 715/855 |
| 5,715,449 A * | 2/1998 | Peters et al. .................. | 707/102 |
| 5,787,417 A * | 7/1998 | Hargrove ............................. | 1/1 |
| 5,805,161 A | 9/1998 | Tiphane | |
| 5,838,320 A | 11/1998 | Matthews, III et al. | |
| 5,859,638 A * | 1/1999 | Coleman et al. .............. | 715/786 |
| 5,896,132 A | 4/1999 | Berstis et al. | |
| 5,943,052 A | 8/1999 | Allen et al. | |
| 5,956,035 A * | 9/1999 | Sciammarella et al. ...... | 715/815 |
| 6,026,409 A * | 2/2000 | Blumenthal .......................... | 1/1 |
| 6,069,595 A | 5/2000 | Tokimoto | |
| 6,069,626 A | 5/2000 | Cline et al. | |
| 6,154,750 A * | 11/2000 | Roberge et al. ............ | 707/104.1 |
| 6,195,094 B1 | 2/2001 | Celebiler | |
| 6,252,594 B1 | 6/2001 | Xia et al. | |
| 6,256,028 B1 * | 7/2001 | Sanford et al. ................ | 715/841 |
| 6,337,694 B1 | 1/2002 | Becker et al. | |
| 6,690,401 B1 * | 2/2004 | Stead ............................ | 715/784 |
| 6,748,376 B1 * | 6/2004 | Beall et al. ............................. | 1/1 |
| 6,983,426 B1 * | 1/2006 | Kobayashi et al. ........... | 715/854 |

(Continued)

FOREIGN PATENT DOCUMENTS

GB    2357946    7/2001

(Continued)

*Primary Examiner* — Weilun Lo
*Assistant Examiner* — Rashedul Hassan
(74) *Attorney, Agent, or Firm* — Thorpe North & Western LLP

(57) ABSTRACT

A method and system are provided for a user interface. The system can include a plurality of information categories and option nodes organized into a hierarchy. A plurality of menu columns can be contained within a window. The menu columns can each be configured to display a portion of the plurality of categories and option nodes. A first scrolling control can be located adjacent to the plurality of menu columns and be configured to scroll the plurality of menu columns in a defined direction across the screen. A second scrolling control can be located adjacent on an opposite site of the plurality of menu columns. The second scrolling control can be linked to the first scrolling control to enable either scrolling control to be moved in the defined direction in order to scroll the menu columns and unused scrolling control simultaneously.

26 Claims, 5 Drawing Sheets

U.S. PATENT DOCUMENTS

| | | |
|---|---|---|
| 7,062,453 B1 * | 6/2006 | Clarke .................... 705/26 |
| 2002/0126155 A1 * | 9/2002 | Lin-Hendel ............. 345/785 |
| 2003/0023583 A1 * | 1/2003 | Eko ............................ 707/3 |
| 2005/0131945 A1 * | 6/2005 | Muller et al. .......... 707/104.1 |
| 2005/0210404 A1 | 9/2005 | Hakiel et al. |
| 2005/0262450 A1 | 11/2005 | Sauermann |
| 2006/0271962 A1 | 11/2006 | Staunton-Lambert et al. |
| 2006/0277574 A1 | 12/2006 | Schein et al. |
| 2007/0150839 A1 * | 6/2007 | Danninger ................ 715/825 |

FOREIGN PATENT DOCUMENTS

| | | |
|---|---|---|
| JP | 9237175 | 9/1997 |
| JP | 9325879 | 12/1997 |
| JP | 2001255978 | 9/2001 |
| JP | 2005209221 | 8/2005 |
| TW | 394913 | 6/2000 |
| WO | WO9600417 | 1/1996 |
| WO | WO2004/057453 | 7/2004 |

* cited by examiner

METHOD AND SYSTEM FOR ORGANIZING AND DISPLAYING DATA

PRIORITY CLAIM

This application claims priority to Australian Provisional Patent Application No. 2006901909 entitled "Method and System of Organising and Displaying Data" filed on Apr. 12, 2006.

BACKGROUND

A majority of software programs or applications are provided with or are adapted to work in combination with a database containing stored data or information. As technology has advanced, and the volume of data is ever expanding, there is an increasing need to provide software programs or applications which are adapted to be able to store, retrieve and display this data in a user-friendly manner. This need is particularly important when displaying vast amounts of data, such as search results, on-line catalogues, and web directories.

Many known user interfaces utilize windows, cursor controls and icons to present and enable data to be accessible via a "point-and-click" type of systems where a user selects and clicks an icon to access further information. Scroll bars have also been developed for use in conjunction with the windows to enable a user to move information contained in a viewable portion of a window horizontally or vertically across the screen via movements of a cursor along the scroll bars. This allows the obscured data adjacent to the previously visible data to become visible.

These scrolling methods are also used in web browsers where the content of the web page is longer than screen size. For example, a user may type a search into a search engine, which returns a number of search hits that the user has to search through by scrolling through the results.

Current searching methods also allow a user to click on a hyperlink that appears to contain the data the user wants to access, which will in turn display various additional pages with related information which the user can review for relevance and selection.

The disadvantage of the current method is that the user never knows exactly what type of results will appear on the next search screen or whether these results will be correct or relevant to the information they seek. Some current methods do employ the use of pop-up menus, which are adapted to produce additional menu topics in response to a user highlighting and/or clicking a particular menu topic. However, the additional menus are not presented in an organised column fashion and are often extremely sensitive to cursor movement whereby a slight movement of the cursor will close the pop-up menus and/or direct the user to a different irrelevant menu topic.

In most systems or applications, a search function is provided which is adapted to search through data stored in a database as a list of relevant results. For example, assuming the user has a search word, the entering of a search word for an internet-based search may reveal a list of results for websites whose recorded description may contain that word. These lists are often extensive, and the task of finding a relevant result and/or web page from the list can not only be quite time-consuming, but assumes that the user has some knowledge and familiarity with the search topic.

When using popular search engines, users are provided with a search result list of links that point to potentially related information. Along the way, advertisement material is shown with often limited value to the User. Next, users have to sift through the search results to find the information they actually want. Finally, users are likely to visit multiple websites in an effort to find pertinent information. Actually finding the desired information is not guaranteed.

In order to overcome this problem, there have been proposed methods for attempting to categorize search results and display the results in a way in which a searcher can find information more quickly and easily. Most of these systems however, utilize programmatically applied algorithms, which can result in the production of many unrelated results and the need for users to open additional web pages to refine their search.

Search directories are commonly arranged in a hierarchical outline form with major topics divided into smaller related topics to whatever level of detail is deemed useful. There are many advantages to using a directory type of organization, especially if the person searching for information is unfamiliar with the topic. The outline structure gives the user a kind of conceptual 'map' of the topic(s). The user can then intuitively browse both back and forward amongst the interconnected topics and information.

In addition, many websites will provide a site map which is a list of main headings for a website which is adapted to provide a general indication what information is provided by that website. However, these site maps may not allow for all sub-categories related to a topic or a search context to be displayed and therefore, a user may miss out on an important link, associated topic, or web page, or may need to review a number of windows before possibly locating the desired data.

As technology advances, computers, operating systems and communication networks such as the internet, are becoming faster at processing, displaying, and moving information. However, when searching through information this can often be a disadvantage, as a user needs time to browse through all the information presented and can only adapt to a certain text or image movement speed. In this regard, the prior art fails to provide a means of controlling the speed of browsing behaviours so that a user can select a desired speed for browsing information.

DETAILED DESCRIPTION

A system and method are provided in the area of information management software and for organizing and categorizing, storing, retrieving and displaying stored information in a powerful system for navigating large amounts of indexed information in user-friendly manner. When applied to the internet, the technology may be used as a directory front-end for conventional search engines or custom search engines, as an interface to provide a complete sitemap or as a specialized directory search engine for one, multiple or an unlimited number of domain(s). Other types of information can be indexed and summarized such as intranets, hard drives, library catalogues, and other repositories of information. Data repositories can be indexed and displayed in just one navigable window.

The method and system can be utilized as a software platform, interface and/or application for software such as an operating system, software application, utility, web browser or application, internet, intranet, virtual computer, a remote interface, or the like. The system can be designed such that it can be utilized with new or existing programmable technologies such as web browsers, web applications, operating systems or the like. Providing an extensive interface and software platform can eliminate the need for additional software products, drivers, plug-ins or the like to be installed. In addition, the method and system can also be implemented for a suitable hardware item such as a computer (client or server), mobile technology such as mobile phones, iPods, hand-held devices, PDAs, digital cameras, organisers, etc.

While the system and method may be applied to a technology which is adapted to display stored information such as a mobile phone, computer, iPod, internet or the like, for convenience sake it shall be described herein in terms of a method and system for categorizing and displaying search results, organized data, or indexed data in a user-friendly manner.

Figure 1:
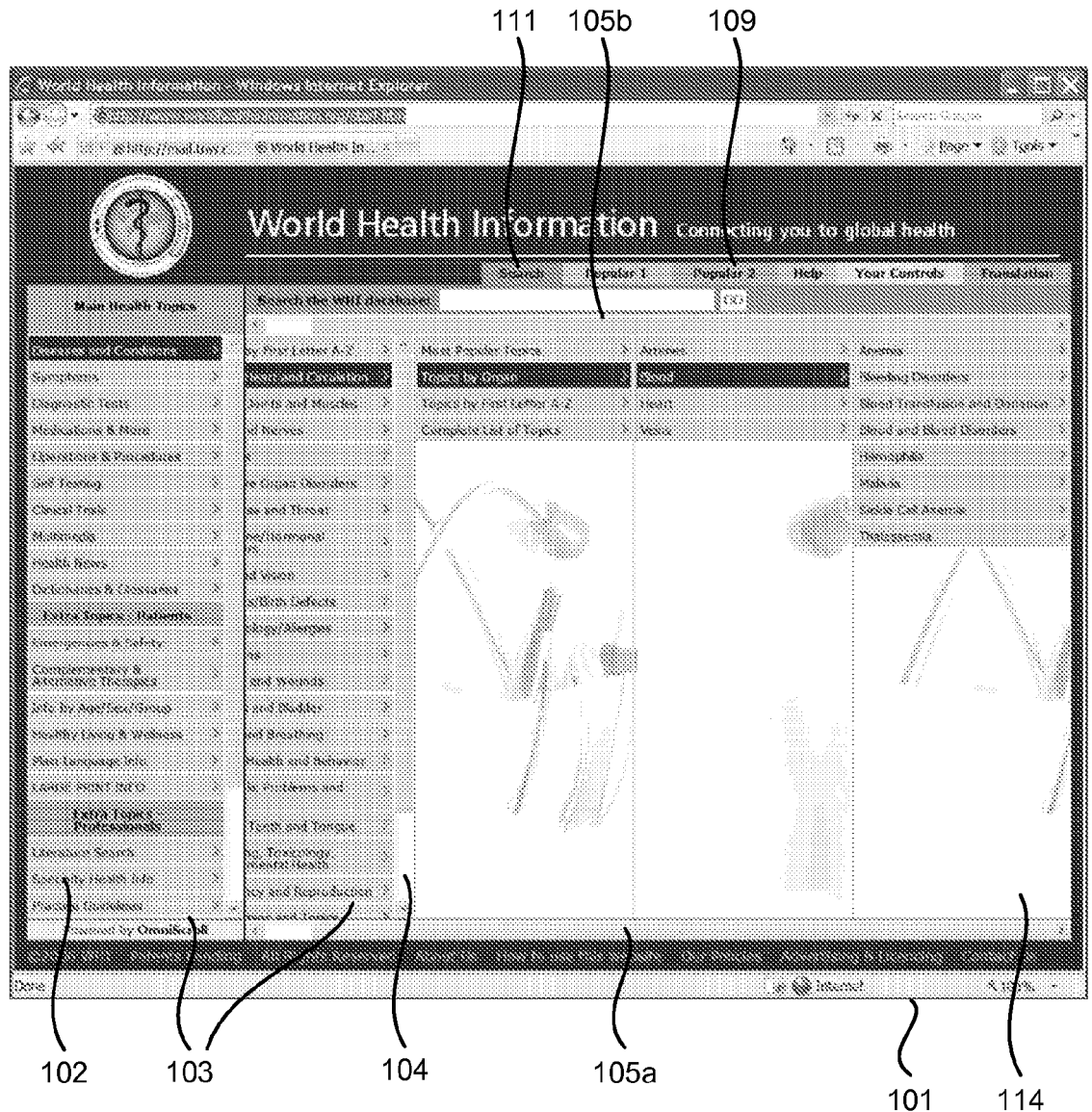
FIG. 1 illustrates an embodiment of a user interface for organizing, categorizing, storing, retrieving and displaying information in a system for navigating large amounts of indexed information.

The system can be in the form of software which exists on its own and/or is part of other software applications, operating systems, browsers or the like. The system may provide a user-interface 101, as illustrated in FIG. 1, which is adapted to enable a user to search and access data which may be locally or remotely stored. In one embodiment, the user-interface 101 is a graphical window that includes one or more columns, which are adapted to present data 102, retrieved from a data repository to a user in an organized and contextual manner. The data repository can be a flat file, a spreadsheet template, or another type of database.

Controls can be provided for accessing and modifying the data contained in the database that supports the user interface. The graphical interface can include controls for simple database manipulation as part of an administrative user interface. From a browser level, the built-in database manipulation controls can control specific data and can turn selected column entries, option nodes, or domains on and off. In a further embodiment, the columns can include an edit function for each column and its dependent column data. This edit function may be restricted to administrative users, or available to all users. Topics, files, items, and similar data can be added or modified for the column and dependent column(s). In yet a further embodiment, the available (targeted) advertisement space in the columns or the results page can be edited by users. A straightforward interface can be provided, such as pop-over menus, which allow either general users or just authorized individuals to edit individual components of the directory or the option nodes. In addition, the users may be able to edit, purchase or otherwise modify targeted advertisement space using an account through which they can purchase, insert, edit and view the desired advertisements and advertisements through the same interface. Other types of databases such as relational databases, object oriented databases, or other known databases can be used.

The data 102 displayed within the column 103 may be provided to each column independently and controlled independently by the system. This can provide an additional level of independence to the system such that, when the results and/or data are refreshed, the entire screen 101 does not necessarily need to be refreshed thus, reducing delays commonly caused by refreshing and redrawing images on the screen. The column may be its own window or its own separately refreshable browser pane. In other words, each column can be refreshed separately along with a portion of the data that has been delivered just for the individual column.

The number of columns 103 provided to display information is variable depending on the depth of information contained within the database (not shown) in relation to a selected data 102 item. This means that data items with a large number of data sub-tree levels can generate a large number of columns. However, the number of columns 103 which can be further generated is virtually unlimited and provides a multi-level system for searching, accessing and displaying data/information 102. While the screen displaying control may be able to display a large number of columns, the term virtually unlimited as used herein means that the actual number of columns which can be created may be limited by memory, mass storage constraints, and other similar constraints. These columns are also defined herein as menu columns because the columns display menu options that allow a user to access another menu column or a menu choice where some additional action is taken such as following a universal resource locator (URL) or a web page is displayed.

The system may provide a number of preset columns 103 which may be filled initially or as further information is accessed or requested. However, the system may also be provided in the form where the column portion or the window or screen 114 is empty, and each column 103 will only appear as the information is accessed or requested by a user. The characteristics of the column 103, such as height, width, colour, shape or the like, may also be varied as desired for a particular application. The number of columns that are viewable on the screen at any one time may depend on the defined width and height of the columns.

The user can click on a topic or category in the preset column or a column returned by a search. The search results in a column returned by a search may contain category menu items, option nodes or a combination of both. Additional columns containing menus or category lists can then be added for each information category activated by an end user from a parent column. These additional menu columns can be added on a side, top, or bottom of the scrolling columns. When the columns are unable to fit within a viewable area of the window, then the columns can be moved off the viewable area and are still accessible using the scrolling controls. These scrolling controls can be two scroll bars or other movement controls. For example, a fixed first column can be provided and subsequent columns can move right behind the first column or off the left edge of the screen once the window's right border capacity has been reached and more dependent columns are presented. This allows a virtually unlimited number of menu columns can be scrolled through in a defined direction.

Figure 3:
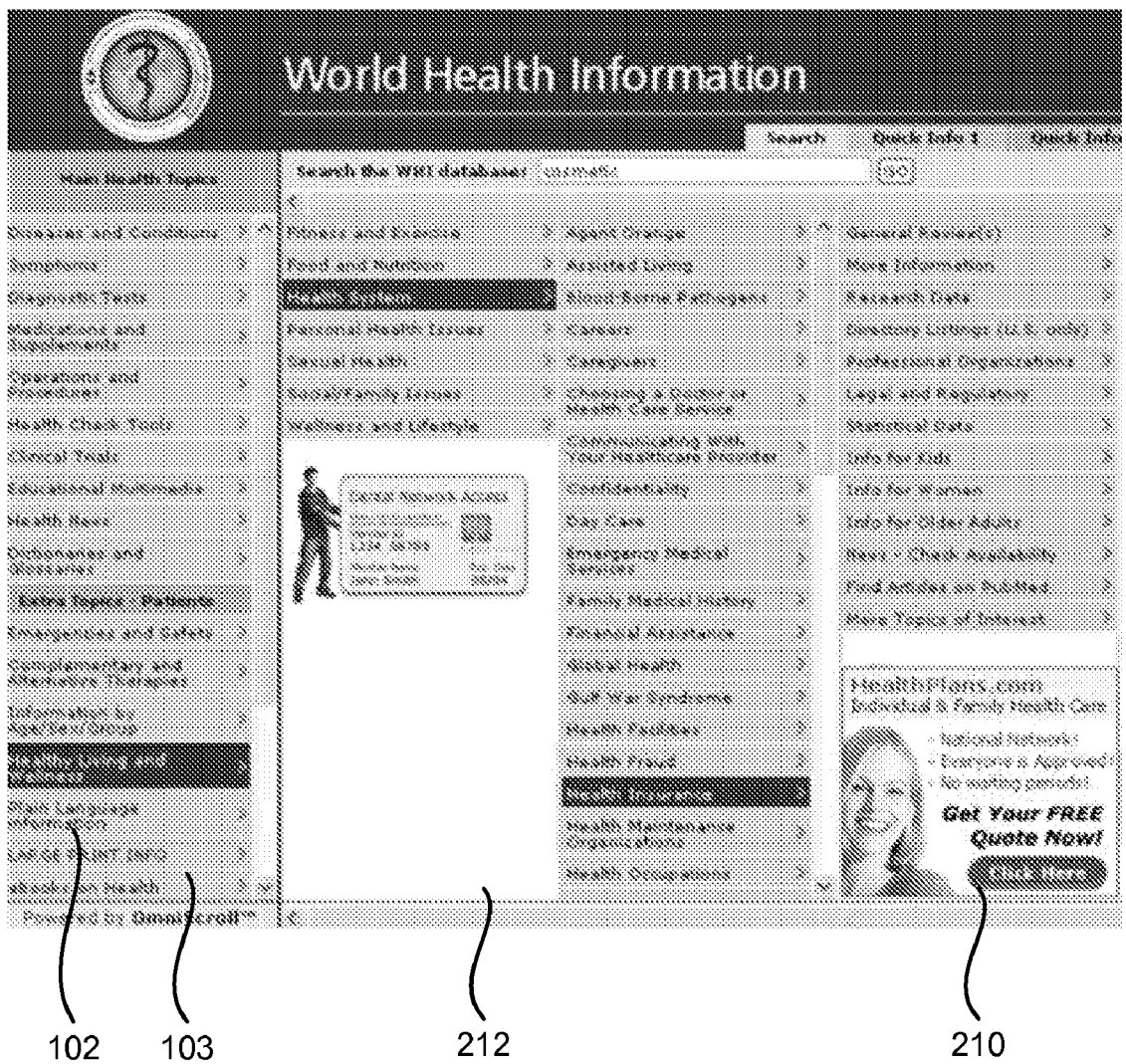
FIG. 3 illustrates an embodiment where a column can display one or more advertisements within an available column space.
Figure 4:
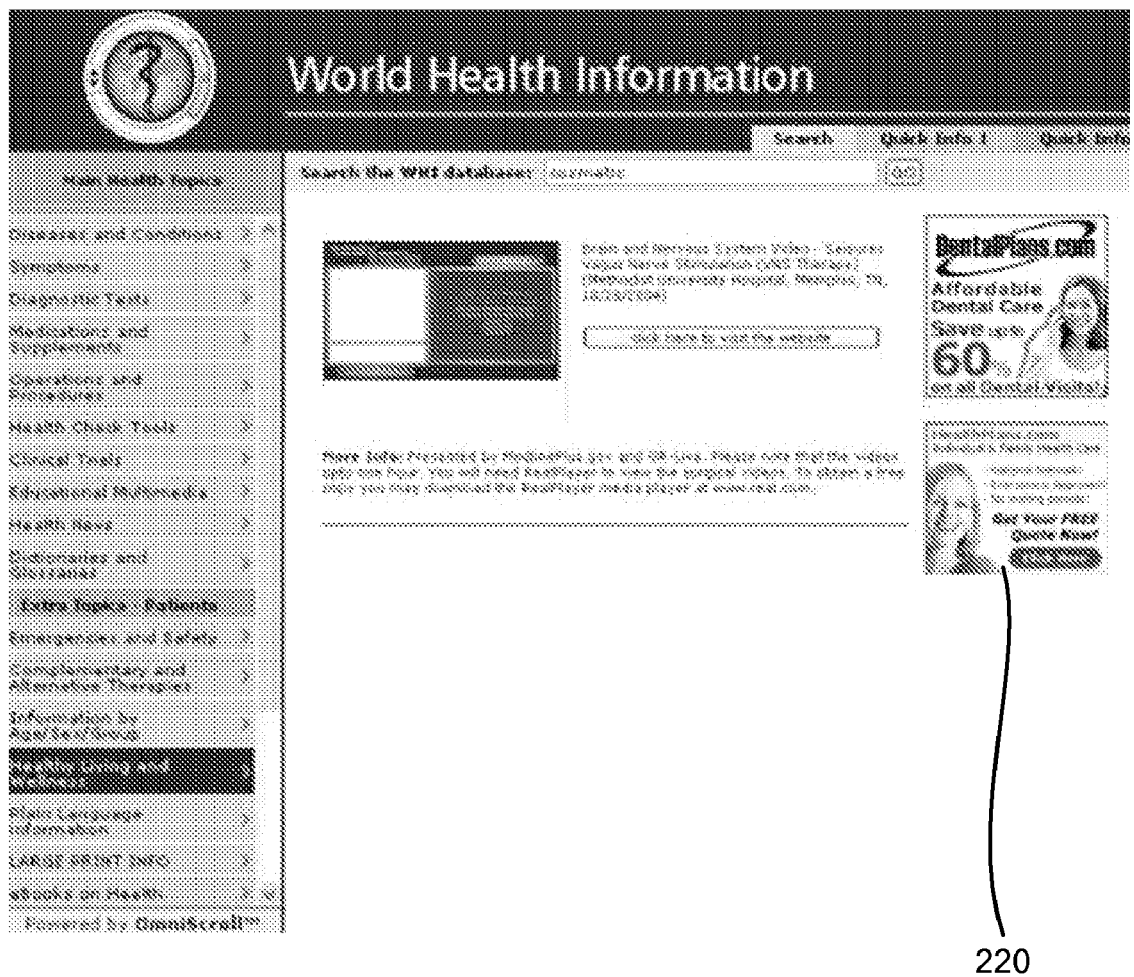
FIG. 4 illustrates an embodiment where an option node can display one or more advertisements within an available column space.

In a further embodiment as illustrated in FIG. 3, where a column 103 is not completely filled by a list of data 102, the column 103 may be adapted to display at least one advertisement 210 within that available space. Alternatively, an empty portion 212 of the column may include other proprietary information, contextual information, or images. It is valuable to advertisers when the advertisements provided within the columns are related to the information 102 being searched, because this allows the advertisements to be more targeted through the sub-levels of information 102 presented to a user. Of course, the advertisements may be unrelated to the information in the columns or similar context. FIG. 4 illustrates an embodiment of the system where an option node can display one or more advertisements within an available space in the option node 220.

Each column 103 can be scrollable such that the amount of information 102 stored within any particular column 103 is not restricted. This scrollable function can appear where there is more information 102 for a particular column 103 than is capable of being displayed on the user-interface 101. Accordingly, the column 103 may have a first movement control such as a scroll bar 104 or the like which is adapted to control movement of the text within the column 103. The scrollbar may be a vertical scroll bar which can be controlled via a cursor control device and/or data input device such as a mouse, user digit for a touch screen, tablet pen, voice activation, iPod wheel, joystick, keyboard, button or another suitable control/input device.

In order to move the scroll bar 104, the cursor can be moved to the scroll bar 104, and the cursor control device used to move the scroll bar up or down by selecting the scroll bar 104 and moving the bar with the control device or input device to move to the scroll bar 104 such that, if the scroll bar 4 is moved upwardly, information contained in the viewable portion of the column will be moved downwardly and obscured data located above the previously viewable portion will now be visible and vice versa if the scroll bar 104 was moved downwardly.

In addition to being able to display an unlimited amount of information 102 within a particular column 3, the system is also designed to be capable of displaying an unlimited number of columns within a given window or screen 101 such that all results/information relating to a particular topic can be scrolled through on a single screen 101 without a user having to open a multitude of windows or interface controls to find the desired information 102. This provides a scrollable column window that can have an unlimited number of levels to enable a user to find and connect to all of the possible available data. In the case of browsing a directory of links to websites or other data, an unlimited number of links can be found and displayed to the user in way that is not overwhelming and the user receives "doses" of the information as the user works through the navigation system. Thus, a complete overview of the data can be provided at each level, which aids in the location of data, files, links, etc.

To achieve this, the system has provided a second movement control which may be in the form of at least one horizontal scroll bar 105a or the like which is adapted to enable a user to scroll through the columns 103 displayed on the screen 101. Where the screen size and/or resolution limits the number of columns 103 capable of being displayed on a screen 101, the earliest selected columns 103 will be automatically scrolled out of view but never deleted. This means that a user can simply scroll back horizontally to view the previously displayed information 102.

While the system and method has been described as allowing the columns to scroll in a horizontal direction, the scrolling direction of the columns is not limited to a single direction. For example, the columns can scroll in any defined direction. The defined direction can include scrolling the columns in a vertical direction (up/down), a diagonal direction, around the edges of the screen in a rectangular tile configuration, or in a tiled depth dimension that is similar to a windows tiling function.

An example of a vertically scrolling column system can provide a list of topics that are placed in a wide, but narrow in height text box in a horizontally oriented column. The selection of one of the topics would open a next column under or above the initial column. The main movement is up and down. This configuration may be useful when dealing with a narrow and long screen, such as a mobile phone. In an alternative embodiment, the navigation can take place forward and backward into the plane of the screen in a three-dimensional (3D) manner. In an additional embodiment, a version of the scrolling or moving columns can use movement in multiple directions in a single user interface. For example, part of the columns may move in a vertical and the other part of the columns may move in a horizontal direction or some other combination of defined directions.

The scrolling menu columns can provide a complete overview of relevant information pertaining to a particular topic so that a user can also locate information by its association to a particular topic or the context within which the topic exists. Graphical window applications have provided a bottom horizontal scroll bar and at least one vertical scroll bar to browse across information provided on a screen. In one embodiment, the system has provided both upper 105b and lower horizontal scroll bars 105a which are adapted to move simultaneously upon movement and control of either the upper or lower horizontal scroll bar. The scroll bars can be programmatically linked so that when one scroll bar is moved then both scroll bars and the columns will move simultaneously. When the columns are configured to move in a different defined direction than just the horizontal direction, the scroll bars can also move in the defined direction.

With the increasing size of computer monitors and television screens being utilized as display monitors, the window can often be quite large in size. As a result users may need to move the cursor over a significant portion of the screen in order to move the state of the art lower horizontal scroll bar(s) for windows and similar interfaces. The added upper horizontal scroll bar 105b increases the user-friendliness of the system because a majority of scrolling and selection activity is often performed toward the top of the screen. Therefore, a user is able to select and utilize either scroll bar 105b, 105a depending on which scroll bar is closer and more convenient to the current cursor position. In addition, the second scroll bar means that the user will not have to traverse the increasingly common large distances provided by larger windows and displays just to scroll the columns.

The present system improves the presentation of data and information 102 and in particular, information, which can be remotely stored. The information 102 may be raw or processed data, written, graphical, video, statistical, pictorial, oral or another type of information 102 desired or combination thereof. In one embodiment, the information 102 provided within a column may have pictures and/or sound associated with it. For example, if a person selected a particular car model, it may be possible to view an image and/or video of that car model and hear what it sounds like when the item is selected.

As the users navigate through the information entries in a column, the user will eventually arrive at an option node. The option node may include a file, graphical image, a universal resource locator (URL) (e.g., hyperlinks), a web page, a program plug-in, a Macromedia Flash player, Java program, ActiveX control, an executable script or another digital representation. In other words, an option node can be an item in a column that results in an action other than providing a next menu column when the option item is selected. In an additional embodiment, the option node may provide access to a physical device such as a USB connected device, network drive, network server, TV cable or set-top box, or even a printer.

In one embodiment, when a user clicks or places the selection cursor over an option node then a window can be opened that covers the columns. When the website is closed, then the hidden columns can be re-displayed. In addition, a web page, web control, or web plug-in may open that fills just one or two column widths. In a similar manner, the option node can display a column showing query search results, an advertisement, or a product that is available for purchase through the web. Accessing the web using the present system and method allows a user to view an unlimited number of web pages and digital object without opening another window, leaving the current window, or creating a new browsing tab.

In another embodiment, when a user clicks or places the selection cursor over an option node then a new browser window can be opened and a web page be opened. When the second browser window is closed, then the initial browser window, showing the columns is still displayed.

The present embodiment, indexes information 102 and presents the information in a list format to a user in a logical and organised manner. The data repository for storing the information 102 can provide multiple views and copies, which are uniquely optimised to best reflect a users' topic of interest. The system is able to locate and display every type of data including sensory data (graphic/audio etc) format at different menu column levels. This is useful for the display of information in catalogues, photo albums, targeted advertisements, etc. In a further embodiment, the system may display and present 3D digital data.

The system may provide at least one browsing option, which enables a user to select an option regarding browsing and interaction modes within the graphical user interface. A first browsing option can be a "point-and-click" option 106, as in FIG. 2, which is adapted to enable a user to browse and interact with the interface 101 by moving the cursor to and clicking a data item 102 of interest to produce a further list of data items 102 which are related to the first selected data item 102. Once the item 102 is selected, further information will not be displayed until that item is selected via clicking or another active selection method provided by an alternative control input device. The information 102 can be selected via a cursor control means or input device such as a mouse, keyboard, voice activation, pen device or other suitable means. Alternatively, a touch screen, voice activation, or similar activation/clicking system may be used.

The system provides a history of the selected information items or information categories as the user navigates through the columns by highlighting the selected information items or information categories. Each time the user chooses a path through the columns the selected columns will continue to be displayed even when the user's cursor passes over previously selected columns. However, when the user goes back to a previous column and selects a new item then the subsequent columns will be erased and a new record can be generated. In a sense, a stable and visual breadcrumb trail is provided to end users for the navigation of a database or website. Furthermore, many other information items or information categories continue to be displayed allowing a complete overview of the users choices. This is valuable because prior browsing and navigations systems do not provide the unlimited visual history of the present system and method. Even after a second browser window or a pane inside the same window opens to visit another web site, the user can still come back to the first browser window location and resume searching.

Figure 2:
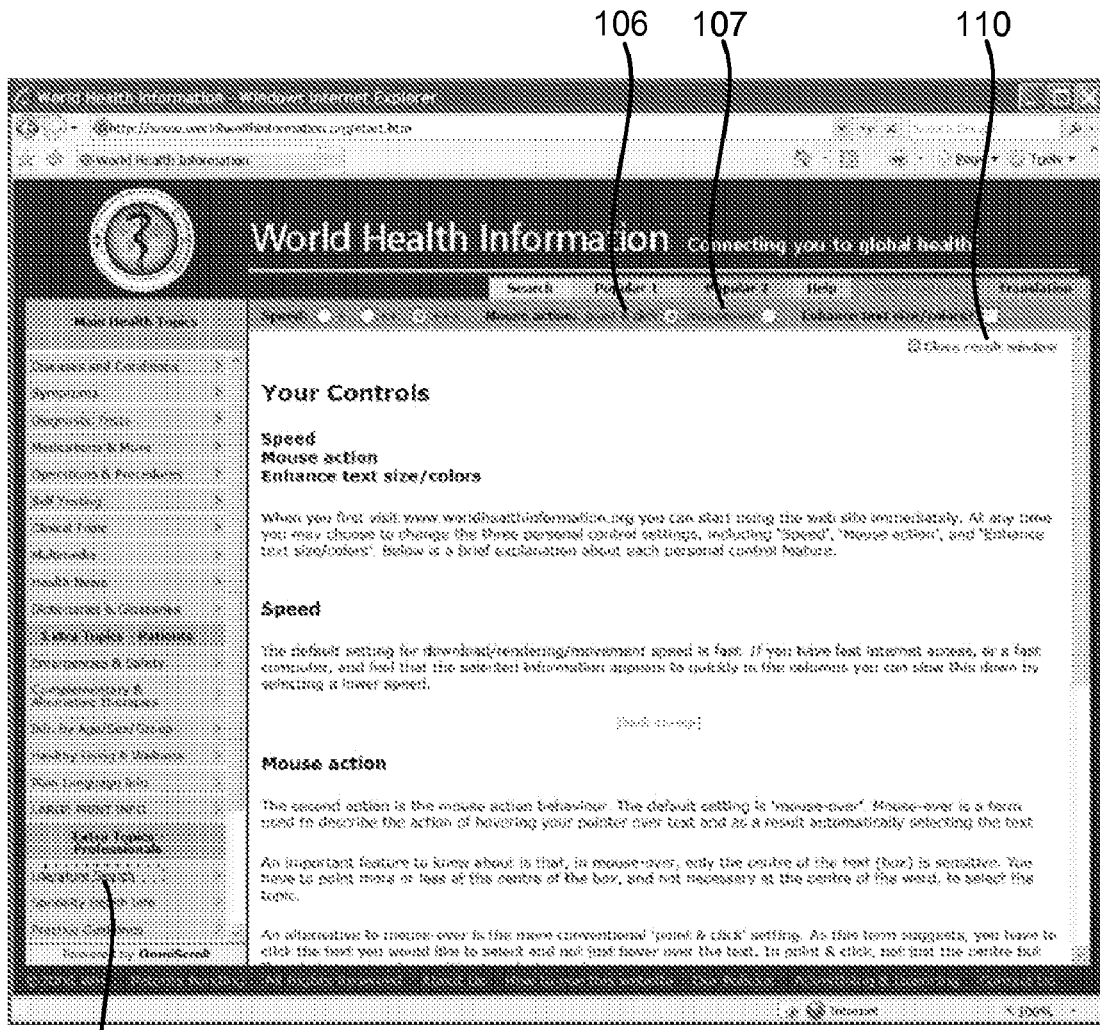
FIG. 2 illustrates an embodiment of a window for controlling browsing options, which enables a user to select an option regarding browsing and interaction modes within the graphical user interface.

A second browsing option can be a "mouse-over" option 107 to enable a user to browse and interact with the interface 101 by moving the cursor over and highlighting a first item 102 of interest to produce a further list of items related to the selected item of interest. Once the item or data is highlighted, the next list of information will appear after a predetermined period of time depending on the "mouse-over" option 107 chosen i.e., mouse-over speed (FIG. 2). The information 102 displayed on the screen will not be highlighted for selection until the cursor is located directly over the information.

In an embodiment illustrated in FIG. 2, the system may provide a sensitivity or detection bar 108 or the like located within a portion of a column such that, movement of the cursor will only cause information 102 to be highlighted where that cursor movement occurs within the sensitivity or detection bar 108 portion of the column 103. The remaining portion of the column may have cursor sensitivity eliminated as testing has shown that it is useful to provide a partially sensitive column to prevent crossover of the cursor into an area which selects another unwanted result that may be contained within the same column.

In one example of column sensitivity, each column may only have a partially sensitive center area. One possible sensitivity distribution can be where the first and left-most 25% of a column entry is non-sensitive. The center area can then have 30% of the column entry that is a sensitive/trigger area, and the last portion or right-most part of the column entry can have 45% of the column entry, which is non-sensitive. The percentages and area distributions for the sensitivity can vary based on the desired interface. Examples of other percentages and area distribution can be: the column entry is 50% sensitive and 50% insensitive, or the area can be divided into quadrants of sensitivity each covering 25% of the column, or the column may be 100% sensitive. The distribution of percentages of the column entry are not limited to any specific percentage and the distribution of the percentages can also be measured from top to bottom of the column entry. In addition, the shape of the sensitive and insensitive areas is not limited and can be of any shape. For example, a graphical image may be displayed and the sensitive area can be a defined colour in the image or a specific part of the image. Without the patterned sensitivity, if the user desires to move the mouse from one column to the next without disturbing the existing columns, the pointer would have to go straight across to the next column in order not to select a column entry above or below the box the user selected. The modified sensitivity helps overcome this problem, and allows the user to pass the pointer over the insensitive portions of column entries, which are above or below the currently selected box to improve navigation.

The system may provide at least one speed control option which is adapted to control the speed at which information 102 is displayed, the speed at which a user is able to browse information 102 on the screen and scroll across columns 103. The speed controls are particularly useful where there is a large amount of related information 102 for a particular topic, which is to be displayed on the screen 1. A first speed control option may be a response option. The response option can be adapted to be applicable in the instance where the mouse-over browsing option has been selected, and is adapted to control the speed at which the next column 103 or list of related information 102 is displayed in response to a user mouse-over and maintaining the position of the cursor over an item 102 for selection. The response option can control the time interval at which the next list of information 102 will displayed and this amount of time can be preset in the software or set by a user preference. For example the mouse-over slow option may have a response time of 3.75 seconds, the mouse-over medium option may have a response time of 1.86 seconds and the mouse-over fast option may have a response time of 1.02 seconds.

A second speed control option may be a download option. The download option is adapted to control the speed at which information 102 is retrieved and downloaded from the data repository or database and displayed. The download option will affect the response rate and refresh rate speeds for information 102 being retrieved from the data repository. This option may have a default setting, which is preset by the software. However, a user may also be able to adjust this setting to suit the capabilities of the computer and/or mobile technology they are using.

A third speed control option may be a movement speed option. The movement speed option is adapted to control the speed at which the columns 103 move across the screen. The speed at which the columns move across the screen as more columns are added and/or as a user moves backward or forward to browse through previously displayed columns, may be preset by the software or adjusted by the user. This option allows the columns to move across the screen at a predetermined speed. To summarize the speed controls, the system can include one or more speed control options, which are adapted to control either the movement speed control, download speed control, or response speed control.

The system may have provided at least one shortcut 109 (FIG. 1), which is adapted to enable a user to enter the database or data repository at a pre-selected sublevel. The shortcut buttons 109 can be positioned across the top of the screen 101 however, it is envisaged that these tabs or buttons 109 could be positioned at a location as desired. The shortcuts 109 may relate to broad topics which, which upon selection, will display a first pre-determined set of information 102 related to that topic to appear in a column 103. Where there are more shortcut buttons 109 than are capable of being displayed within the window or screen 101, the area containing the shortcut button 109 will be provided with an arrow at either end to enable a user to scroll forward or backward through the shortcut buttons. Depending on the topics selected within the columns, the shortcut buttons may be updated to reflect the related shortcuts.

The method for organizing and displaying information 102 within a software application enables a user to select a desired topic or information 102 for which they wish to obtain more information 102. A user can begin browsing and/or searching via a number of different methods. A first method for initiating browsing and/or searching may be via the use of shortcut buttons 109. These shortcut buttons 109 may relate to broad topics or headings, which can be used to divide or sort the data 102 in the data repository. The shortcuts can also provide other indications (e.g., graphics, icons or photos) for groupings of the data stored within the data repository and upon selection, and a column will display a portion of the overall data related to that topic or heading. In other words, a shortcut or button may be clicked to dynamically display an entire column of data that relates to a topic.

A second method for initiating browsing and/or searching is to have a set of preset data, topics or headings similar to the shortcuts control 109 but more comprehensive and/or specific located either within a first column or listed elsewhere on the screen, which are pre-programmed by the software and are adapted to prompt the user to select a particular area of interest. This column of pre-set data can either scroll to display more information or remain fixed.

A third method for initiating browsing and/or searching can use a search engine. The system may provide a search facility 111, which enables a user to enter a term relating to a particular area of interest for which they would like to receive further information. The system will then search the data depository for data related to that term and display a list of relevant results, hyperlinks, for a user to select from. Alternatively, the search may return one or more columns from the database that can be displayed to a user. This combination of search features and directory features provides a powerful research mechanism for users of the system.

A fourth method for initiating browsing and/or searching can use a third party search engine. After selecting topics from the various columns, then a breadcrumb trail is shown. This breadcrumb trail can be submitted to a third party search engine as a search string.

From a starting point within the database or data repository which may be achieved via the methods described above, the related information 102 can be retrieved and displayed to a user in a user-friendly manner, such as a list format within a column 103 arrangement. The selection of an item of information 102 from a list may result in one or more actions. An action may be the presentation of a further list of related information 102 to the left or right of the existing results allowing for further exploration or providing detailed information about a single selected topic. The presentation of further information 102 pertaining to a particular topic may continue through as many levels as desired in order to find the target topic the user is searching for. While the user is continuing to navigate, the previous results may remain visible in each column 103 enabling a user to view their path through the retrieved results.

The search results displayed within a column 103 can be the start of deeper exploration of information relating to a particular topic contained within the database or data repository. So a user is not overwhelmed by a large amount of information 102 being initially presented to them upon entering a search query, further information 102 regarding a particular topic/search result is displayed upon request by the user.

As the path of search results produced always remains visible, the user can at a later stage go back to a particular column and select a different item to product a different set of results. The new results will only be updated from that column 103 forward. Once the user has found the desired end result or information 103, then a number of possible actions can be taken. The first action may be that the user is able to open or access the data. The second action may be that the user will be directed to a relevant website or URL.

The third action may be that once a desired result or item is selected, a results window will be opened which may provide further detailed information with a link, which the user can select to go to the specific site or destination. The results window may be closed 110 (FIG. 2) to take the user back to the search results window in the instance that the selected result was not what they were looking for. The link provided by the end result may be deliberately hidden by the system to ensure that a third party cannot extract the links for their own purposes. The links or URLs provided by the end result can be hidden by the system and can only be obtained by accessing the relevant data within the columns to view a single link or URL for a digital object. This functionality is an added security feature of the system, which ensures that the database containing the information and list of URLs or links is hidden from a user. Alternatively, the system can enable the end user to see one URL or link at a time while browsing.

The data 102 in the data repository can be reviewed, assessed and graded by human operators. Unlike previous search software which relies on programmatically applied algorithms and can result in many unrelated results, the use of human graded results is likely to increase the relevance of search results. However, mathematical algorithms may also be able to copy human grading in the future. The logical organization of data increases the chance of being able to find the desired data and related topics in a quicker time-frame by making the process user-friendly and by providing context.

Figure 5:
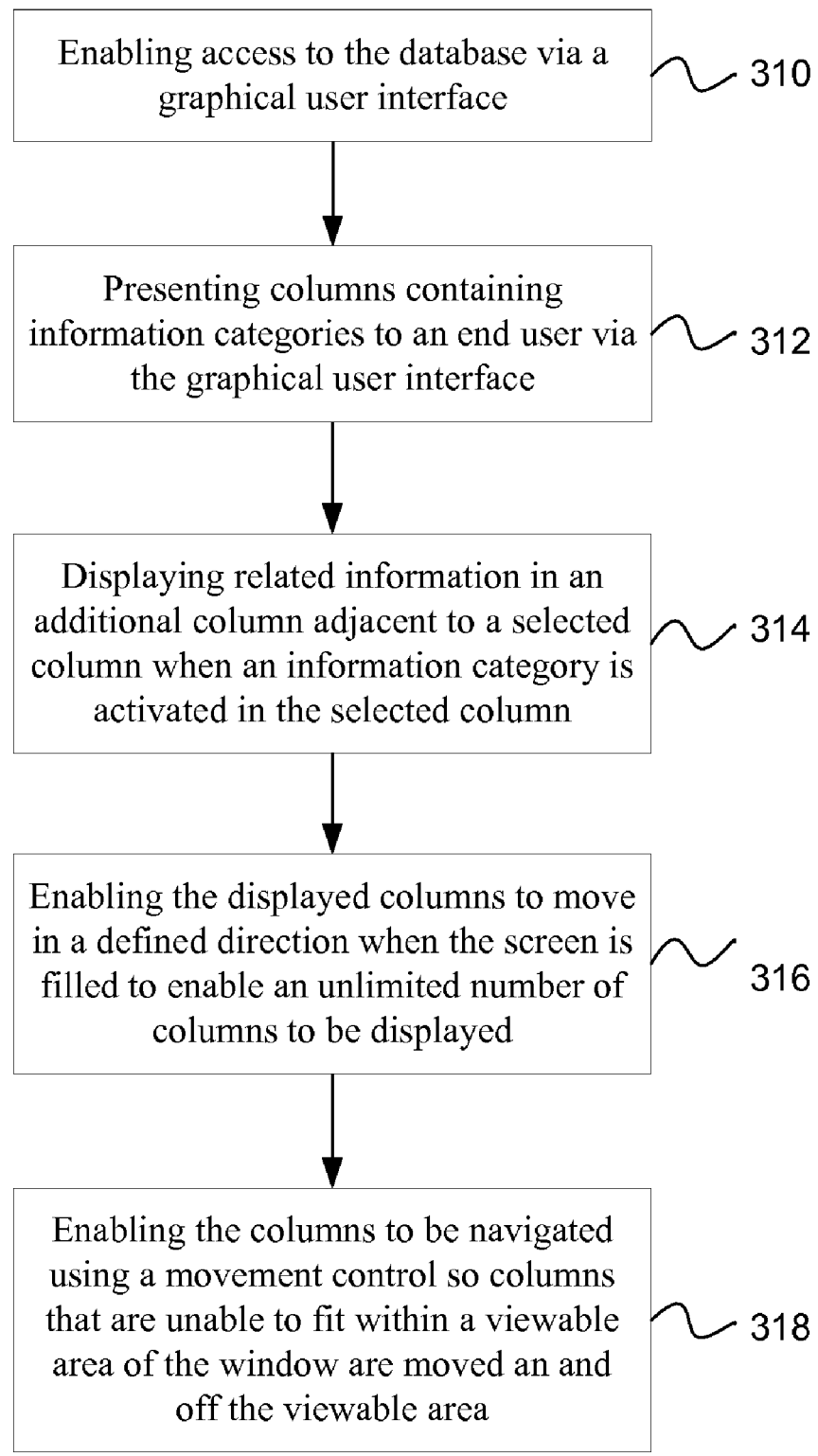
FIG. 5 is a flowchart illustrating an embodiment of a method for controlling a user interface configured to access a plurality of information categories in a database.

FIG. 5 illustrates a method of controlling a user interface configured to access a plurality of information categories in a database. The method can include the operation of enabling access to the database via a graphical user interface, as in block 310. The database may be an underlying spreadsheet, flat file or relational database. Another operation is presenting at least one column containing information categories to an end user via the graphical user interface, as in block 312.

Then related information can be displayed in an additional column adjacent to a selected column when an information category is activated in the selected column, as in block 314. The additional columns may open in any direction, namely right, left, above or below the column that is generating the new column. The activation of the category can be done by clicking the information category or by "mousing-over" the category. The displayed columns can be moved in a defined direction when the screen is filled to enable an unlimited number of columns to be displayed, as in block 316. The columns can be navigated using a movement control associated with the columns, and columns that are unable to fit within a viewable area of the window are moved off the viewable area and are accessible using the movement control, as in block 318. The movement control can be a scroll bar or another incremental movement graphical control.

The scrollable column window automatically opens a next column when a column entry is selected. This change takes place when a column entry is actively selected in the previous column using a point and click system or a controlled area of sensitivity. Such controls are a significant advantage as compared to pop-up menus, which tend to be unstable, jumpy, only have a few levels, and often drop away when a user is scrolling through the pop-up choices. The present system and method also reduces the distance a user has to travel across the screen to navigate the columns in a defined direction.

While a particular embodiment of a method and system for organising and displaying information has been described herein, other embodiments of the invention could exhibit any number and combination of any one of the features previously described. However, it is to be understood that any variations and modifications can be made without departing from the spirit and scope of the present invention.

The invention claimed is:

1. A user interface on an electronic computing device, comprising:
 a plurality of information categories and option nodes organized into a hierarchy;
 a display screen associated with the electronic computing device, comprising a plurality of menu columns contained within a window on the display screen associated with the electronic computing device, the menu columns each being configured to display to an end user a portion of the plurality of categories and option nodes;
 a first scrolling control, located adjacent the plurality of menu columns, configured to scroll the plurality of menu columns in a defined direction across the screen;
 a second scrolling control located adjacent and on an opposite side of the plurality of menu columns, the second scrolling control being linked to the first scrolling control to enable either scrolling control to be moved in the defined direction in order to scroll the menu columns and unused scrolling control simultaneously;
 a graphical button comprising a shortcut to any desirable menu column within the plurality of menu columns having at least one parent column, and wherein selection of the shortcut results in a display of the menu column and the at least one parent column; and
 an input device associated with the electronic computing device for enabling user interaction;
 wherein:
 the menu columns are configured to add an additional column for each information category accessed by an end user and additional menu columns are added on a side of the scrolling columns; and
 columns other than the additional menu column that are unable to fit within a viewable area of the window are automatically moved off the viewable area to enable an unlimited number of menu columns to be adjacently displayed, and are accessible using the first and second scrolling controls.

2. A user interface as in claim 1, further comprising a speed control configured to control a speed of a response rate and refresh rate for information being retrieved from a data repository.

3. A user interface as in claim 1, further comprising a search control configured to supply a menu column with at least one hierarchical sub-menu column as a result in response to a search query.

4. A user interface as in claim 1, wherein an unlimited number of menu columns can be scrolled through in the defined direction.

5. A user interface as in claim 1, further comprising a download speed control for the user interface configured to control a rate at which data is downloaded into each expanding column.

6. A user interface as in claim 1, further comprising a column scroll bar applied to menu columns having a length exceeding a total viewable area, the column scroll bar being configured to scroll in a direction perpendicular to the defined direction.

7. A user interface as in claim 1, further comprising a data speed control configured to control a speed at which the data is downloaded for display with respect to the user's control event.

8. A user interface as in claim 1, wherein each menu column can independently refresh after receiving updated data.

9. A user interface as in claim 1, wherein an end user is able to select whether the information categories in the menu columns are activated using point-and-click or mouse-over interface actions.

10. A user interface as in claim 1, wherein a selectable_information category display has a first area in a menu column that is insensitive to activation and a second area adjacent to the first area that is sensitive to activation and a third area that is insensitive to activation that is adjacent to the second area.

11. A user interface as in claim 1, further comprising a search control configured to submit menu column selections to a third-party search engine.

12. A user interface as in claim 1, wherein automatically moving columns off the viewable area of the window comprises shifting all of the viewable columns to the left.

13. A user interface as in claim 1, wherein the menu columns are configured to remove a column for each parent information category returned to by an end user, and wherein removal of the column results in automatically shifting the parent information category to the right of the viewable area to display one or more additional columns to the left of the parent information category.

14. A user interface as in claim 1, wherein at least one of the option nodes comprises a link, application, or shortcut which can be opened over a plurality of menu columns in a same window as the plurality of menu columns, the opened link, application, or shortcut comprising a close option operable to close the opened link, application, or shortcut to reveal the plurality of menu columns in the same window and in the same configuration as before opening of the link, application, or shortcut.

15. A user interface as in claim 1, wherein each menu column comprises at least one column entry, and wherein each column entry comprises patterned sensitivity regions.

16. A user interface as in claim 1, wherein the shortcut to the desirable menu column comprises a shortcut to a menus column having at least one parent column, and wherein selection of the shortcut results in a display of the menu column and the at least one parent column.

17. A user interface as in claim 1, wherein the plurality of menu columns contained within the window comprises a fixed main topic menu column not controlled by the first and second scrolling controls, the main topic menu column comprising a main topic scrolling control configured to scroll a plurality of main topic categories.

18. A user interface as in claim 17, wherein the menu columns are configured to add an additional column for each information category accessed by an end user, each additional column comprising a column scrolling control when the plurality of categories and option nodes for the additional column do not fit within a viewable area of the window.

19. A user interface as in claim 18, wherein additional menu columns are added on a side of the scrolling columns, and columns that are unable to fit within a viewable area of the window are automatically moved off the viewable area and are accessible using the first and second scrolling controls, and wherein all of the viewable columns except for the fixed main topic menu column are shifted to the left to make space for the additional menu column.

20. A user interface as in claim 1, wherein the graphical button comprises a predetermined shortcut to the desirable menu column.

21. A user interface as in claim 1, wherein the graphical button comprises a search button operating in combination with a search input field, such that the shortcut comprises a user-defined shortcut to the desirable menu column based on search input in the search input field.

22. A user interface on an electronic computing device, comprising:
   a plurality of information categories and option nodes organized into a hierarchy;
   a display screen associated with the electronic display screen, comprising a window having a plurality of menu columns for each displaying portions of the plurality of information categories and option nodes to an end user on the display screen associated with the electronic computing device;
   a first scrolling control located below the plurality of menu columns, configured to move the plurality of menu columns in a defined direction;
   a second scrolling control located above the plurality of menu columns, the second scrolling control being linked to the first scrolling control to enable either scrolling control to be moved while the counterpart scrolling control respectively moves;
   a speed control module for controlling movement speed of menu columns as the menu columns are scrolled through by an end user using the first and second scrolling controls;
   a graphical button comprising a shortcut to any desirable menu column within the plurality of menu columns having at least one parent column, and wherein selection of the shortcut results in a display of the menu column and the at least one parent column; and
   an input device associated with the electronic computing device for enabling user interaction;
   wherein additional menu columns are added on a first side of the scrolling columns for each information category accessed by an end user and columns other than the additional menu columns that are unable to fit within a viewable area of the window are moved toward a second side of the viewable area to enable an unlimited number of menu columns to be adjacently displayed and are accessible using the first and second scrolling controls.

23. A user interface as in claim 22, further comprising a search control configured to supply menu column results in response to a search query.

24. A method for controlling a user interface configured to access a plurality of information categories in a database, comprising:
   enabling access to the database via a graphical user interface;
   presenting at least one menu column containing information categories to an end user via the graphical user interface;
   displaying further related information in an additional menu column adjacent to an active menu column when an information category is selected in the active menu column;
   enabling the displayed menu columns to move in a defined direction when a display screen is filled to enable an unlimited number of additional menu columns to be adjacently displayed, each additional menu column added to the display separately in response to a separate information category selection in different active menu columns;
   enabling the menu columns to be navigated using a first scroll bar below the menu columns, and second scroll bar above the menu columns which is linked to the first scroll bar, to provide simultaneous movement in the defined direction regardless of which scroll bar is used;
   providing a graphical button comprising a shortcut to any desirable menu column within the plurality of menu columns having at least one parent column, and wherein selection of the shortcut results in a display of the menu column and the at least one parent column; and
   wherein menu columns that are unable to fit within a viewable area of the window are moved off the viewable area to make room for one or more additional menu columns within the viewable area and menu columns that are moved off the viewable area are accessible using the first or second scroll.

25. A method as in claim 24, comprising controlling a speed at which information is retrieved and downloaded from a data repository and displayed.

26. A method as in claim 24, supplying menu column results with at least one hierarchical sub-menu column in response to a search query from a search string formed from a plurality of menu column selections.

* * * * *